United States Patent
Benesi (12) 
(10) Patent No.: US 6,491,817 B1
(45) Date of Patent: Dec. 10, 2002

(54) SHALLOW CHAMBER FILTER APPARATUS

(76) Inventor: Steve C. Benesi, 611 McClay Rd., Novato, CA (US) 94947

( * ) Notice: Subject to any disclaimer, the term of this patent is extended or adjusted under 35 U.S.C. 154(b) by 0 days.

(21) Appl. No.: 09/476,144

(22) Filed: Jan. 3, 2000

Related U.S. Application Data (60) Provisional application No. 60/114,604, filed on Jan. 4, 1999.

(51) Int. Cl.[7] .......................... B01D 29/09; B01D 35/30; B01D 25/30
(52) U.S. Cl. ................... 210/227; 210/231; 210/387; 210/456
(58) Field of Search ............................... 210/456, 227, 210/400, 783, 387, 231

(56) References Cited

U.S. PATENT DOCUMENTS

| | | | |
|---|---|---|---|
| 3,608,734 A | * 9/1971 | Schneider | 210/387 |
| 5,059,318 A | 10/1991 | Benesi | 210/227 |
| 5,292,434 A | 3/1994 | Benesi | 210/227 |
| 5,462,677 A | 10/1995 | Benesi | 210/227 |
| 5,477,891 A | 12/1995 | Benesi | 210/500.1 |
| 5,510,025 A | 4/1996 | Benesi | 210/227 |
| 5,573,667 A | 11/1996 | Benesi | 210/227 |
| 5,615,713 A | 4/1997 | Benesi | 210/500.1 |

\* cited by examiner

*Primary Examiner*—Robert J. Popovics
(74) *Attorney, Agent, or Firm*—George W. Wasson; Mark Blumenkrantz (57) ABSTRACT

A pressure filter includes two continuous mating surfaces movable relative each other and a filter medium capable of being disposed therebetween. A surface, provided for supporting the filter medium, is bounded by and is substantially coplanar with one of the continuous mating surfaces. The filter further includes a shallow inlet cavity, bounded by the other of the continuous mating surfaces, and an inlet distributor in communication with the inlet cavity. The inlet distributor includes at least one opening and may be of internal or external type. When the mating surfaces are pressed together, a shallow filtration chamber is defined by the inlet cavity and the filter medium. The filter apparatus may include a plurality of shallow filtration chambers, stacked one above the other, and constructed as described above.

18 Claims, 9 Drawing Sheets

FIG. 30 ary. To separate the

SHALLOW CHAMBER FILTER APPARATUS

CROSS-REFERENCE TO RELATED APPLICATIONS

This application claims the benefit of U.S. Provisional Application No. 60/114,604, filed Jan. 4, 1999.

STATEMENT REGARDING FEDERALLY-SPONSORED RESEARCH OR DEVELOPMENT

Not applicable

REFERENCE TO MICROFICHE APPENDIX

Not applicable

BACKGROUND OF THE INVENTION

This invention relates to a filter apparatus and method of its operation, particularly to a pressure filter and method for extracting liquids from difficult-to-filter wet slurry fluids and for producing a substantially-dry filter cake of the solid materials present in such slurry fluids.

In many industrial processes and other applications where a slurry of solids and liquids is produced, it becomes necessary to filter the slurry solids from the liquids so that these materials may be efficiently utilized or, alternatively, disposed in an environmentally-safe manner. To separate the solids from the liquids, a filter apparatus, such as a pressure filter, is often used. Known pressure filters generally include one or more pairs of filter plates capable of relative motion. The inlet plate is adapted for receiving the slurry, while the filtered liquids, called the filtrate, are collected by means of the outlet plate, which also provides the requisite support for a filter medium, positioned between the filter plates. This arrangement permits a filtration chamber to be defined by the inlet plate and the filter medium when the plates are pressed together. In the usual production cycle of such a filter, slurry is introduced into the filtration chamber under pressure through an inlet port, whereby it distributes itself throughout the chamber. After the filtration chamber is filled with slurry, the filter executes a series of programmed operations, namely, washing and/or treating the contents of the chamber in a particular manner, as well as pressurizing the chamber to force the liquids from the slurry through the filter medium, leaving the slurry solids, consolidated in a substantially-dry filter cake, within the chamber. The chamber is then opened, allowing the dry filter cake to be removed therefrom.

Known pressure filters are capable of successfully treating a wide variety of slurries. However, the use of such filters has shown to be impractical for filtering certain difficult-to-filter slurries, such as gluten, kaolin, and pigment slurries, to name a few. Some of these difficult-to-filter slurries are too viscous to achieve uniform distribution throughout a conventional deep filtration chamber, making it difficult to force the liquids from the slurry when the filtration chamber is pressurized. This difficulty arises because any voids existing in the slurry due to non-uniform slurry distribution within the filtration chamber allow pressure to escape from the chamber through the filter medium without driving out the interstitial liquids from the slurry being filtered.

Moreover, certain slurries having non-viscous characteristics have also proven to be difficult to filter, either because they contain fine particles, e.g., fines on the order of 0.5–10 microns, or because they include compressible solids. In both cases, the thickness of a filter cake being formed in a deep filtration chamber of a conventional pressure filter is sufficient to make the cake virtually impermeable to liquids under pressure. As a result, the time required to produce a substantially-dry filter cake for these types of difficult-to-filter slurries drastically increases, making it economically unfeasible to use known pressure filters for treating such slurries.

Thus, a need arises for a pressure-filter apparatus capable of efficiently treating difficult-to-filter slurries, such as the types of slurries described above.

It is also desirable to provide a pressure-filter apparatus that maximizes the available filter area in an apparatus having a multi-chamber configuration.

Furthermore, it is desirable to provide a pressure-filter apparatus that is energy-efficient and is capable of producing a substantially-dry filter cake in a minimum amount of time.

SUMMARY OF THE INVENTION

A pressure filter is disclosed. The filter apparatus includes two continuous mating surfaces movable relative each other and a filter medium capable of being disposed therebetween. A surface is provided for supporting the filter medium. This supporting surface is bounded by and is, substantially coplanar with one of the continuous mating surfaces. The filter further includes a shallow inlet cavity, bounded by the other of the continuous mating surfaces, and an inlet distributor in communication with the inlet cavity. When the mating surfaces are pressed together, a shallow filtration chamber is defined by the inlet cavity and the filter medium. The filter apparatus may include a plurality of shallow filtration chambers, constructed as described above.

The advantages of the invention will become apparent after consideration of the ensuing description and the accompanying drawings.

BRIEF DESCRIPTION OF THE DRAWINGS

The present invention is illustrated by way of example, and not by way of limitation, in the figures of the accompanying drawings, where.

For purposes of illustration, these figures are not necessarily drawn to scale. In all of the figures, like components are designated by like reference numerals.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described to avoid unnecessarily obscuring the invention. Accordingly, the specification and drawings are to be regarded in an illustrative, rather than a restrictive, sense.

Figure 1:
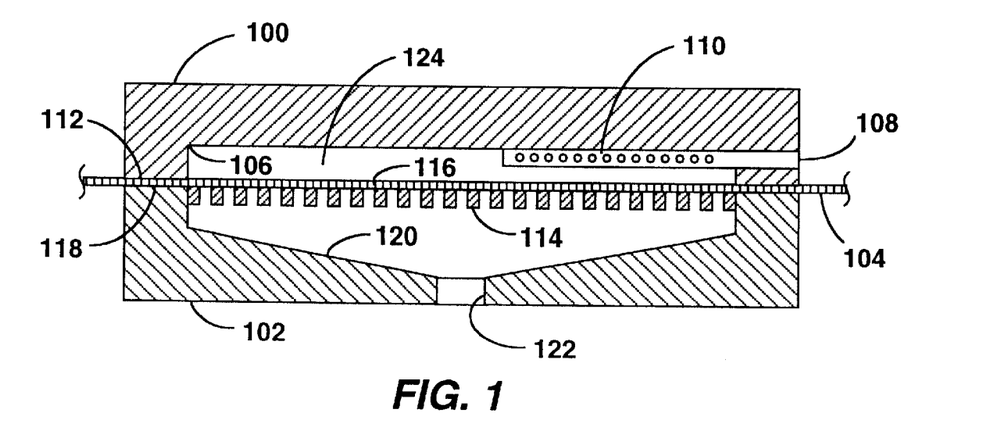
FIG. 1 is a schematic sectional view of a pressure-filter apparatus in accordance with one embodiment of the present invention.

FIG. 1 is a schematic sectional view of the pressure filter apparatus according to one embodiment of the present invention. The filter comprises an inlet plate 100 and an outlet plate 102, movable relative to each other, with a filter medium 104 capable of being disposed therebetween. Inlet plate 100 includes a shallow inlet cavity 106 and an inlet port 108, which communicates with cavity 106 through an inlet distributor 110. Inlet port 108 may be horizontal, as shown in FIG. 1, or vertical, as will become apparent from the ensuing description. The inlet distributor in FIG. 1 is shown only schematically and its various configurations will be described in detail below. Shallow inlet cavity 106 is bounded by a continuous mating surface 112. Outlet plate 102 incorporates a grid 114, which provides a supporting surface 116 for filter medium 104. Supporting surface 116 is bounded by and is substantially coplanar with (e.g., approximately 1/16 of an inch below) a continuous mating surface 118. Plate 102 further includes an outlet cavity 120 for collecting the filtrate liquids and an exit port 122 for discharging the filtrate, which may then undergo further processing or be properly disposed. The peripheral shape of plates 100 and 102 may take any form, but is usually rectangular or circular.

When plates 100 and 102 are pressed together, as illustrated in FIG. 1, a shallow filtration chamber 124 is defined by inlet cavity 106 and filter medium 104. It should be understood that the longitudinal and transverse dimensions of the filter medium inside chamber 124 exceed the corresponding dimensions of shallow inlet cavity 106. The depth of the shallow filtration chamber 124 may vary from about 0.25 of an inch to about 2.5 inches, depending on the type of difficult-to-filter slurry the filter is designed to treat. The shallow depth of filtration chamber 124 promotes uniform distribution of viscous slurries within the chamber because a shallow chamber fills more readily than a conventional deep chamber, thus impeding the formation of voids in the slurry entering the chamber. As discussed above, any voids in the slurry within the filtration chamber will allow pressure to escape from the chamber through the filter medium without effectively driving out the interstitial liquids from the slurry being filtered. The shallow depth of the filtration chamber also promotes the consolidation of solids as the slurry is being introduced into inlet cavity 106 under pressure. Moreover, the shallow depth of filtration chamber 124 limits the thickness of a slurry layer inside the chamber, minimizing the time required to produce a substantially-dry filter cake for dilute slurries containing fines or compressible particles because a thin filter cake composed of such materials remains permeable to liquids under pressure, as opposed to a thick filter cake. Another advantage of a pressure filter having a shallow chamber is its energy efficiency. A filter with a shallow chamber uses less energy than a conventional deep-chamber filter because a smaller quantity of compressible fluids is required to pressurize a shallow filtration chamber.

Figure 2:
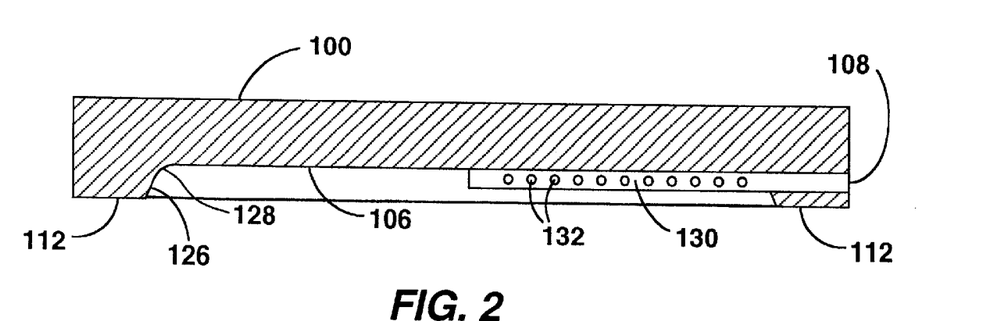
FIG. 2 is a sectional view of an inlet plate having a shallow inlet cavity and an internal transfer conduit projecting into the interior of the shallow inlet cavity.

It should be noted that FIG. 1 provides only a schematic representation of the pressure-filter apparatus according to a particular embodiment of the present invention and that certain elements of the apparatus either have not been shown or have been shown in simplified form to avoid unnecessarily obscuring the invention. For example, continuous mating surfaces 112 and 118 may contain recessed grooves having fluid connections for providing an effective seal between the mating surfaces of the filter plates to substantially reduce or completely eliminate leakage of slurry fluids between the filter plates. The specific details of such an arrangement are disclosed in U.S. Pat. No. 5,059,318 to the present inventor, which is hereby incorporated by reference. Similarly, grid 114 represents only one possible structure for providing the requisite supporting surface for filter medium 104. Other alternatives for supporting the filter medium, as well as specific arrangements and construction of the filter plates, the filter medium, and other components of the filter apparatus have been provided in U.S. Pat. Nos. 5,292,424, 5,462,677, 5,477,891, 5,510,025, 5,573,667, and 5,615,713 to the present inventor, all of which are hereby incorporated by reference. Even though shallow inlet cavity 106 has been schematically illustrated in FIG. 1 as having square corners and vertical sidewalls, in practice it may be beneficial to provide an inlet cavity incorporating tapered sidewalls 126 and radiused corners 128, as shown in FIG. 2, to prevent the filter cake from adhering to the inside of inlet plate 100.

One particular configuration of inlet distributor 110, schematically represented in FIG. 1, is discussed with reference to FIG. 2, which is a bottom plan view of inlet plate 100, having a circular shape. In this embodiment of the invention, the inlet distributor comprises an internal transfer conduit 130, projecting into the interior of shallow inlet cavity. Transfer conduit 130 is in communication with inlet port 108 and includes a plurality of openings 132, directed substantially parallel to filter medium 104 and supporting surface 116 (FIG. 1). Directed thusly, openings 132 provide an optimal distribution of the slurry within the filtration chamber and permit subsequent application of pressurized fluids through the transfer conduit to the wet slurry inside the chamber without disturbing the uniform distribution of the slurry. The combined area of openings 132 is at least equal to or greater than the area of inlet port 108. Accordingly, the inlet velocity of the slurry is reduced as it passes through transfer conduit 130 and enters inlet cavity 106.

Figure 3:
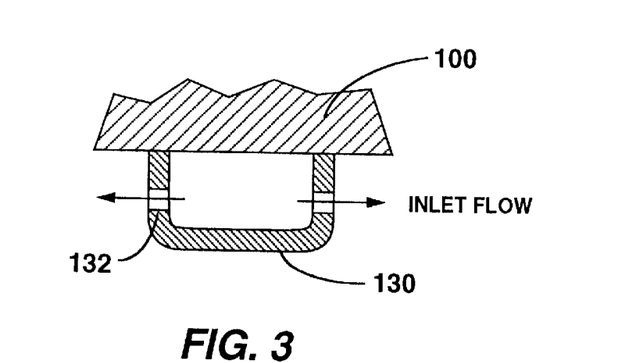
FIG. 3 is a sectional view of the transfer conduit of FIG. 2.
Figure 4:
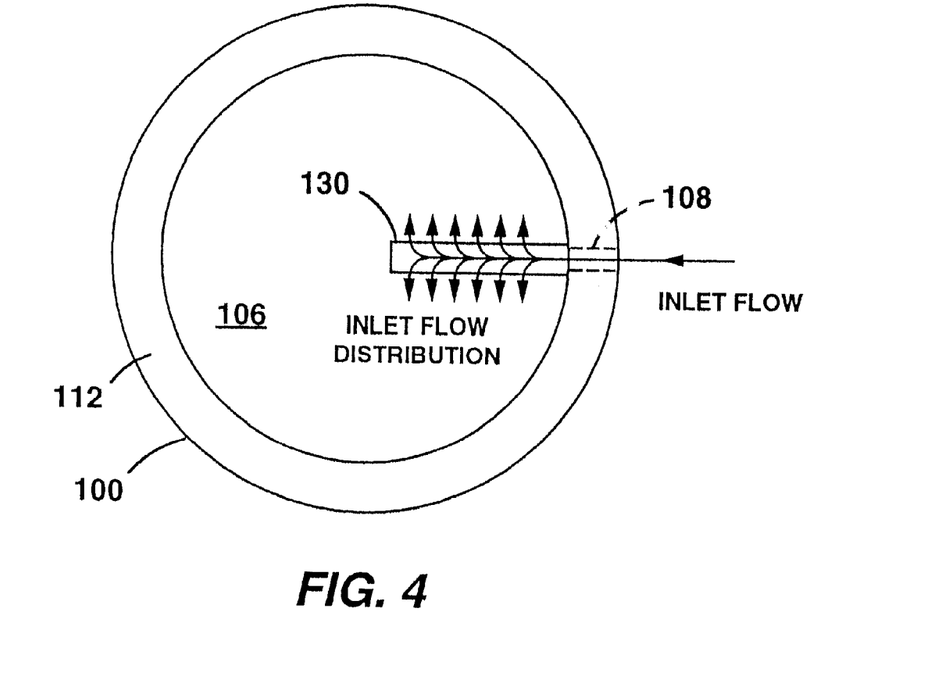
FIG. 4 is a bottom plan view of the inlet plate of FIG. 2.

As the slurry fills the filtration chamber, transfer conduit 130 renders the flow of the slurry laminar, thus promoting uniform distribution of the slurry in the chamber. Openings 132 may comprise a plurality of round apertures or longitudinal slots. Alternatively, openings 132 may be executed as two slits, each extending on one side of conduit 130 along the entire length thereof. As shown in FIG. 3, transfer conduit 130 may have a U-shaped transverse section, but other sections, such as O- or V-shaped sections may be utilized as necessary. Transfer conduit 130 may be made of metal and could be attached to the interior of plate 100, e.g., by welds (not shown). Alternatively, transfer conduit 130 could be manufactured from other materials, e.g., plastic, and could be monolithic with or attached to the interior of plate 100 with screw-type fasteners or other means obvious to one of ordinary skill in the art. FIG. 4 illustrates the bottom plan view of plate 100, making apparent one possible inlet flow pattern that transfer conduit 130 may provide. Transfer conduit 130 should not be so wide as to impede the distribution of slurry and fluids required for its treatment on the filter medium underneath the conduit.

The operation of the above-described embodiment of the invention is illustrated with respect to FIG. 1. In the usual production cycle of the pressure filter, slurry is introduced into shallow filtration chamber 124 under pressure through inlet port 108 and is distributed throughout the filtration chamber via the inlet distributor, i.e., openings 132 of transfer conduit 130. Transfer conduit 130 reduces the velocity of the inlet flow of slurry and directs the slurry into the filtration chamber. As the slurry fills the chamber, its flow is rendered laminar by transfer conduct 130, thus promoting uniform distribution of the slurry within the chamber. After the filtration chamber is filled with slurry, the filter executes a series of programmed operations. These may include washing and/or treating the contents of the chamber in a particular manner. A variety of different liquids and gases may be utilized for this purpose, as required. The chamber may also be pressurized wits e.g., compressed air or another gas, to force the liquids from the slurry through the filter medium, leaving the slurry solids, consolidated in a substantially-dry filter cake, within the chamber. The fluids necessary for washing, treating, and pressurizing the slurry within the chamber are introduced via inlet port 108 and pass through openings 132 of transfer conduit 130. Because openings 132 are oriented substantially parallel to filter medium 104, which rests on supporting surface 116, these fluids are distributed throughout the chamber substantially without disturbing the uniform distribution of the slurry. Alternatively, depending on the particular slurry being filtered, the acts of washing, treating, and even the pressurizing may be omitted in favor of uniformly distributing the slurry in the shallow filtration chamber under pressure, thus consolidating the slurry solids and forcing the liquids from the slurry. Once the appropriate sequence of slurry treatments has been completed by the filter apparatus, the chamber is opened, allowing the dry filter cake to be removed therefrom. It should be noted that the operation of additional embodiments of the invention, the description of which follows immediately below, is substantially the same as that of the above-described embodiment. Hence, the operation of these additional embodiments will not be described in detail in view of the foregoing discussion.

Figure 5:
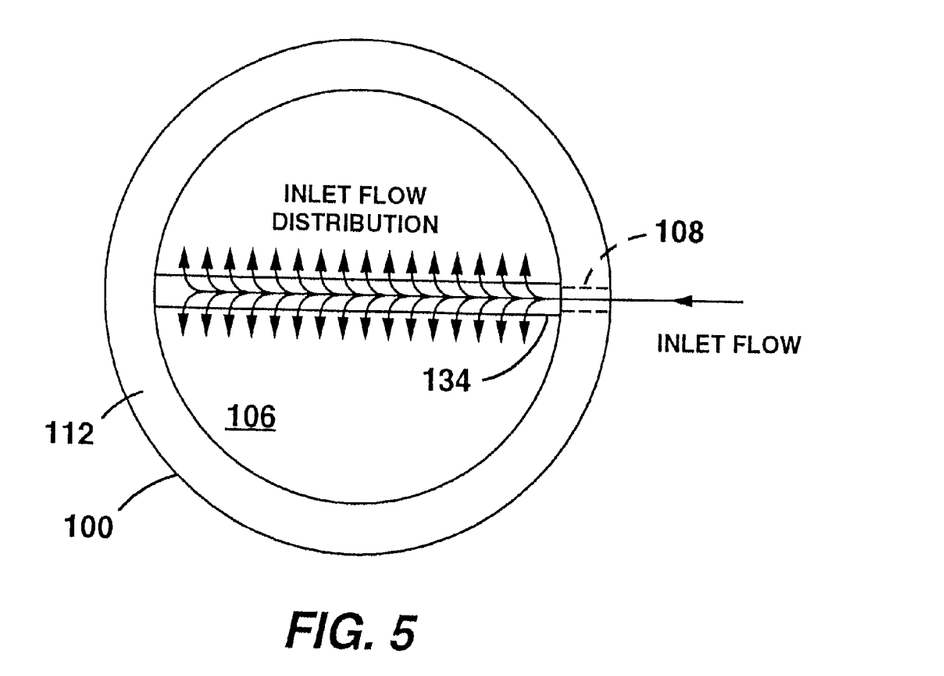
FIG. 5 is a bottom plan view of an inlet plate having a shallow inlet cavity and a transfer conduit, with both ends of the transfer conduit contiguous with the walls of the inlet cavity.
Figure 6:
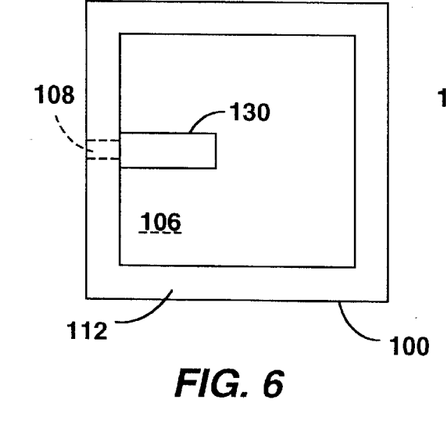
FIG. 6 is a bottom plan view of a rectangular inlet plate having a shallow inlet cavity and a transfer conduit projecting into the interior of the shallow inlet cavity.
Figure 7:
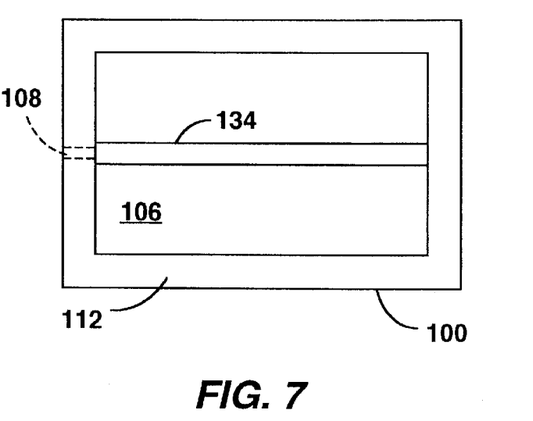
FIG. 7 is a bottom plan view of a rectangular inlet plate having a shallow inlet cavity and a transfer conduit, with both ends of the transfer conduit contiguous with the walls of the inlet cavity.
Figure 8:
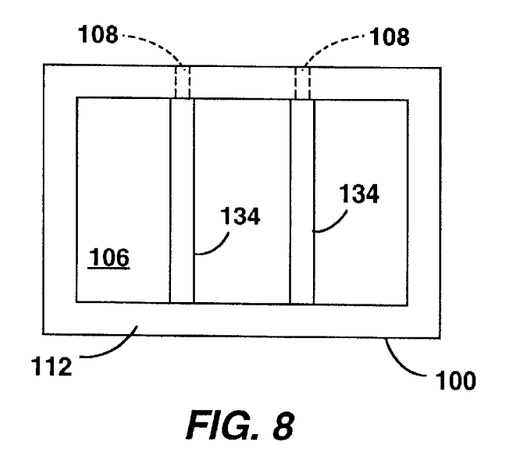
FIG. 8 is a bottom plan view of a rectangular inlet plate having a shallow inlet cavity and a plurality of transfer conduits, with both ends of each transfer conduit contiguous with the walls of the inlet cavity.

Many other modifications of the shallow-chamber filter apparatus, some of which are described herein, are possible. For instance, the inlet distributor may comprise an internal transfer conduit 134, illustrated in FIG. 5. The construction of transfer conduit 134 is substantially the same as that of conduit 130, discussed with reference to FIG. 4, except that both ends of conduit 134 are contiguous with the sidewalls of inlet cavity 106. Transfer conduits 130 and 134 may also be fitted to inlet plates 100 having a rectangular shape, as shown in FIGS. 6 and 7, respectively. Furthermore, inlet plate 100 may include a plurality of inlet ports 108 and a plurality of internal transfer conduits 134, as depicted in FIG. 8.

Figure 9:
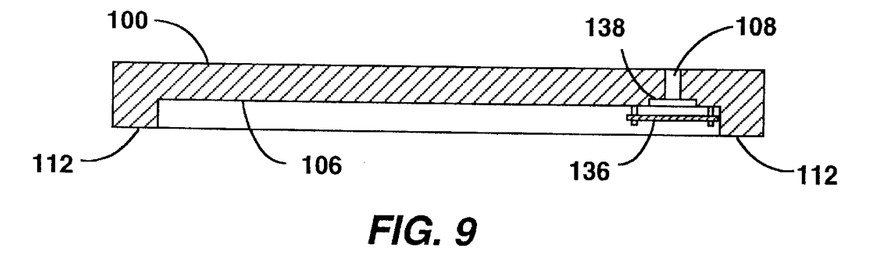
FIG. 9 is a sectional view of an inlet plate including a baffle plate.
Figures 10, 11, 12:
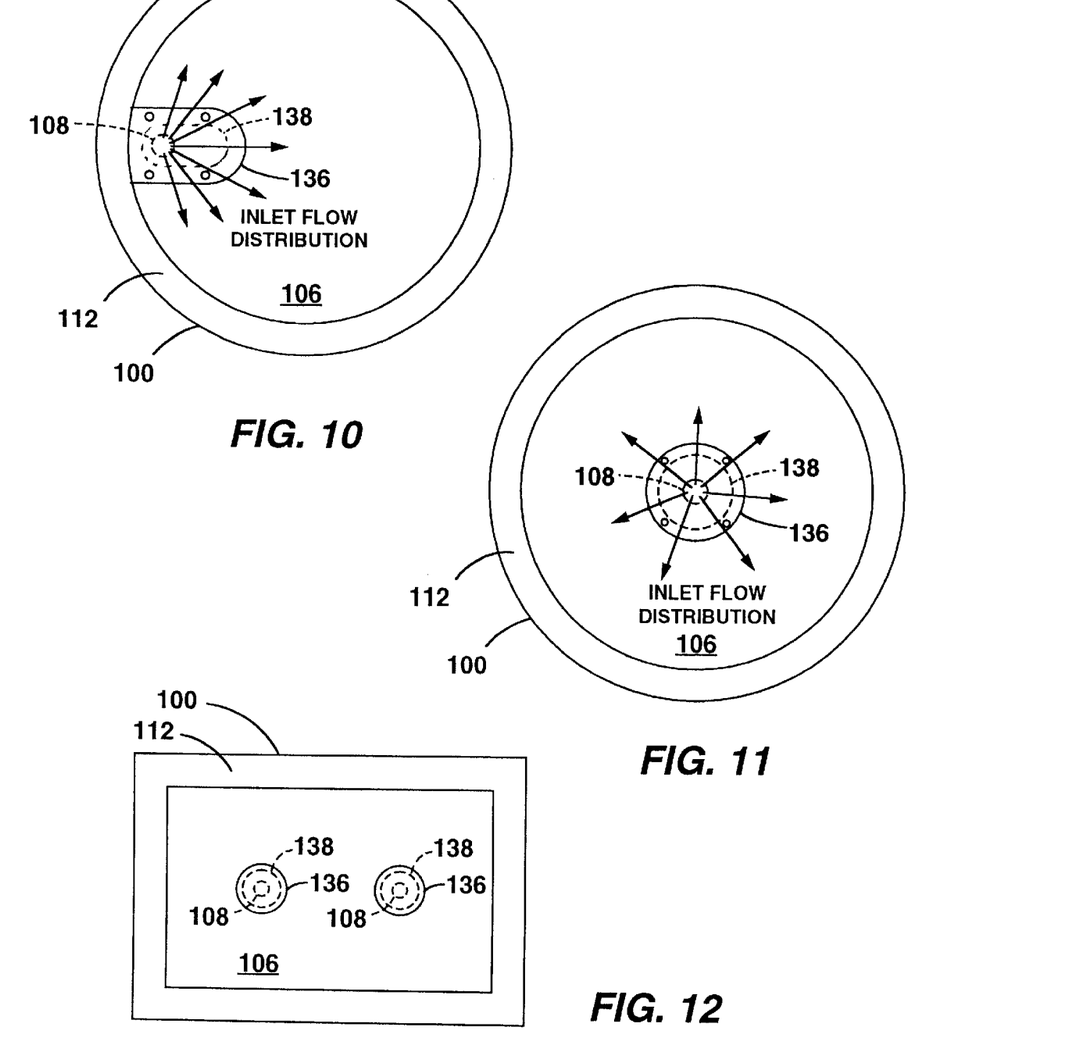
FIG. 10 is a bottom plan view of the inlet plate of FIG. 9.
FIG. 11 is a bottom plan view of an inlet plate having a centrally-located baffle plate.
FIG. 12 is a bottom plan view of an inlet plate having a plurality of baffle plates.

As discussed above, inlet plate 100 may include a vertical inlet port. In this instance, the inlet distributor may comprise a baffle plate 136 (FIG. 9), substantially parallel to filter medium 104 and supporting surface 116 (both shown in FIG. 1). As illustrated in FIG. 9, baffle plate 136 may be attached to the interior of shallow inlet cavity 106 with screw-type fasteners or may be mounted using other methods known to one of ordinary skill in the art. Although not required, a distribution recess 138, which is in communication with inlet port 108, may be directed toward baffle plate 136. The function of recess 138 is to reduce the inlet velocity of fluids as they are introduced into inlet cavity 106 through inlet port 108. Baffle 136 further acts to uniformly distribute these fluids in a laminar flow path, while diverting the inlet flow in the direction substantially parallel to filter medium 104 and supporting surface 116 (both shown in FIG. 1). Thus, baffle plate 136 not only promotes uniform distribution of the slurry in the shallow filtration chamber, but also substantially prevents any fluids subsequently introduced into the filtration chamber from disturbing the uniform distribution of the slurry. FIG. 10 illustrates the flow pattern established by baffle plate 136 when fluids enter the filtration chamber. Baffle plate 136 may also be centrally located with respect to inlet plate 100, as shown in FIG. 11. Alternatively, as represented in FIG. 12, inlet plate 100 may include a plurality of inlet ports 108 and a plurality of baffle plates 136.

Figures 13, 14:
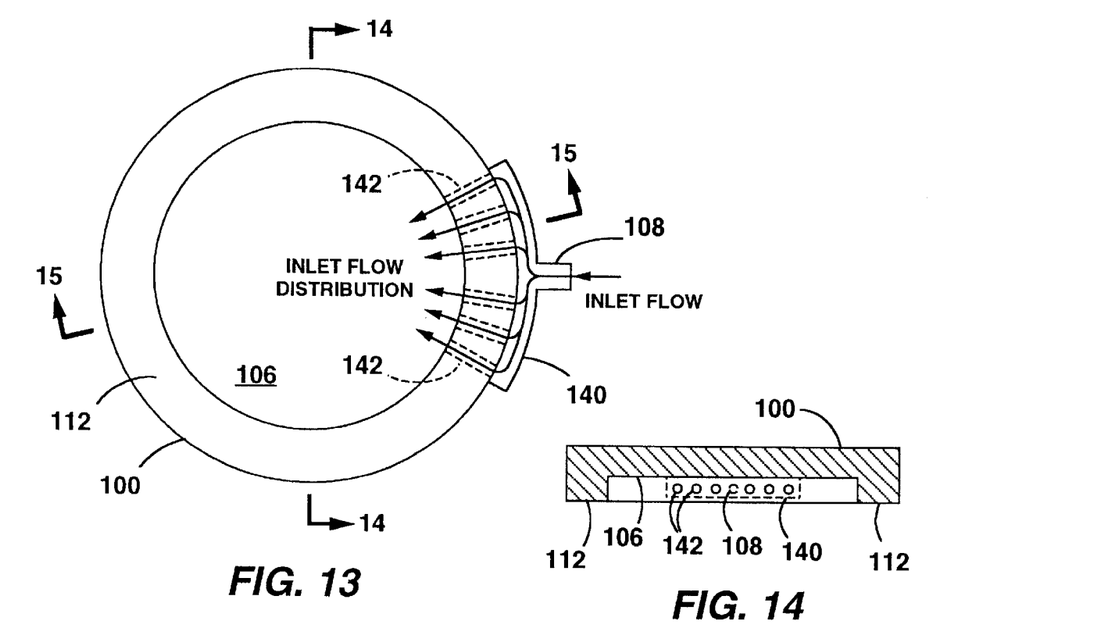
FIG. 13 is a bottom plan view of an inlet plate having an external transfer conduit.
FIG. 14 is a sectional view taken along the lines 14—14 of FIG. 13.

Yet another embodiment of the pressure-filter apparatus is discussed with reference to FIGS. 13–21. In this embodiment, the inlet distributor comprises a transfer conduit 140 located on the exterior of inlet plate 100 along the periphery thereof (FIG. 13). Conduit 140 communicates with inlet cavity 106 via a plurality of openings 142, formed in the sidewalls of inlet plate 102 and oriented substantially parallel to filter medium 104 and supporting surface 116 (FIG. 1). Such orientation of openings 142 provides an optimum distribution of the slurry within the filtration chamber and permits subsequent application of pressurized fluids through the transfer conduit to the slurry inside the filtration chamber without disturbing the uniform distribution of the slurry within the chamber. FIG. 14, which is a sectional view taken along the lines 14—14 of FIG. 13, represents inlet plate 100 that includes transfer conduit 140.

The combined area of openings 142 is at least equal to or greater than the area of inlet port 108. This configuration reduces the inlet velocity of the slurry as it passes through transfer conduit 140 and enters inlet cavity 106, thus producing a laminar flow of slurry as it fills the shallow filtration chamber 124, which promotes uniform distribution of the slurry in the filtration chamber. Openings 142 may comprise a plurality of round apertures or longitudinal slots. As evident from FIG. 15, which is a sectional view taken along the lines 15—15 of FIG. 13, transfer conduit 140 may have a U-shaped transverse section, but other sections, such as O- or V-shaped sections may be utilized as necessary. Transfer conduit 140 may be made of metal and could be attached to the exterior of plate 100, e.g., by welds (not shown). The transfer conduit may also be made from other materials, e.g., plastic, and may be monolithic with or attached to the periphery of the plate using other known fastening means.

Figures 15, 16:
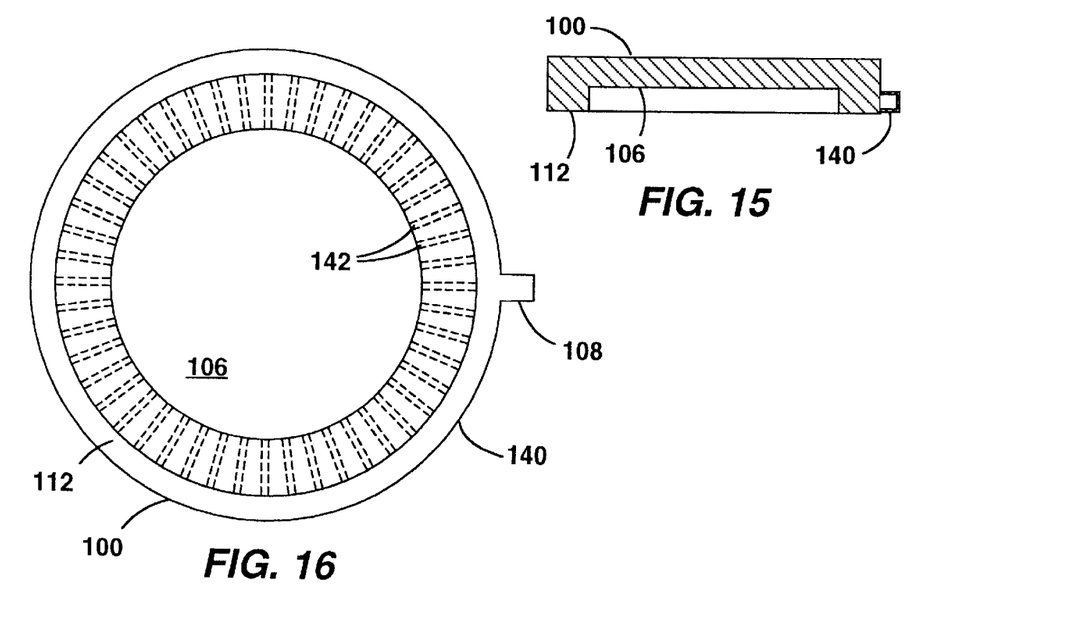
FIG. 15 is a sectional view taken along the. lines 15—15 of FIG. 13.
FIGS. 16 and 17 are bottom plan views of inlet plates each having a continuous external transfer conduit.
Figures 17, 18, 19:
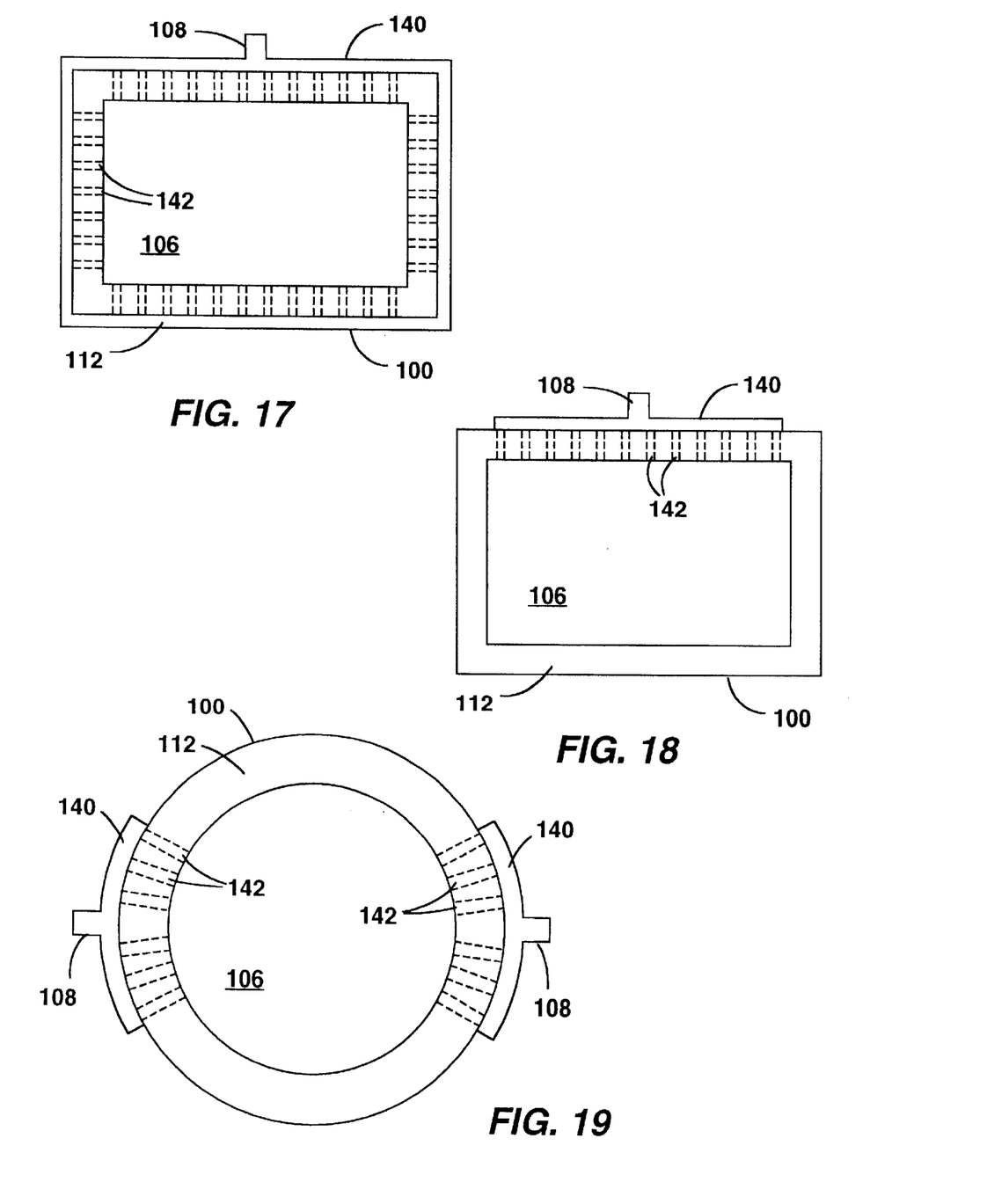
FIG. 18 is a bottom plan view of a rectangular inlet plate having an external transfer conduit disposed along one side thereof.
FIGS. 19, 20, and 21 are a bottom plan views of inlet plates each having a plurality of external transfer conduits.

Transfer conduit 140 may have a continuous configuration, as illustrated in FIGS. 16 and 17. A square inlet plate 100 may include a single transfer conduit 140 disposed along one side thereof, as represented in FIG. 18. As evident from FIGS. 19, 20, and 21, inlet plate 100 may also include a plurality of inlet ports 108 and a plurality of external transfer conduits 140.

Figures 20, 21, 22, 23, 24:
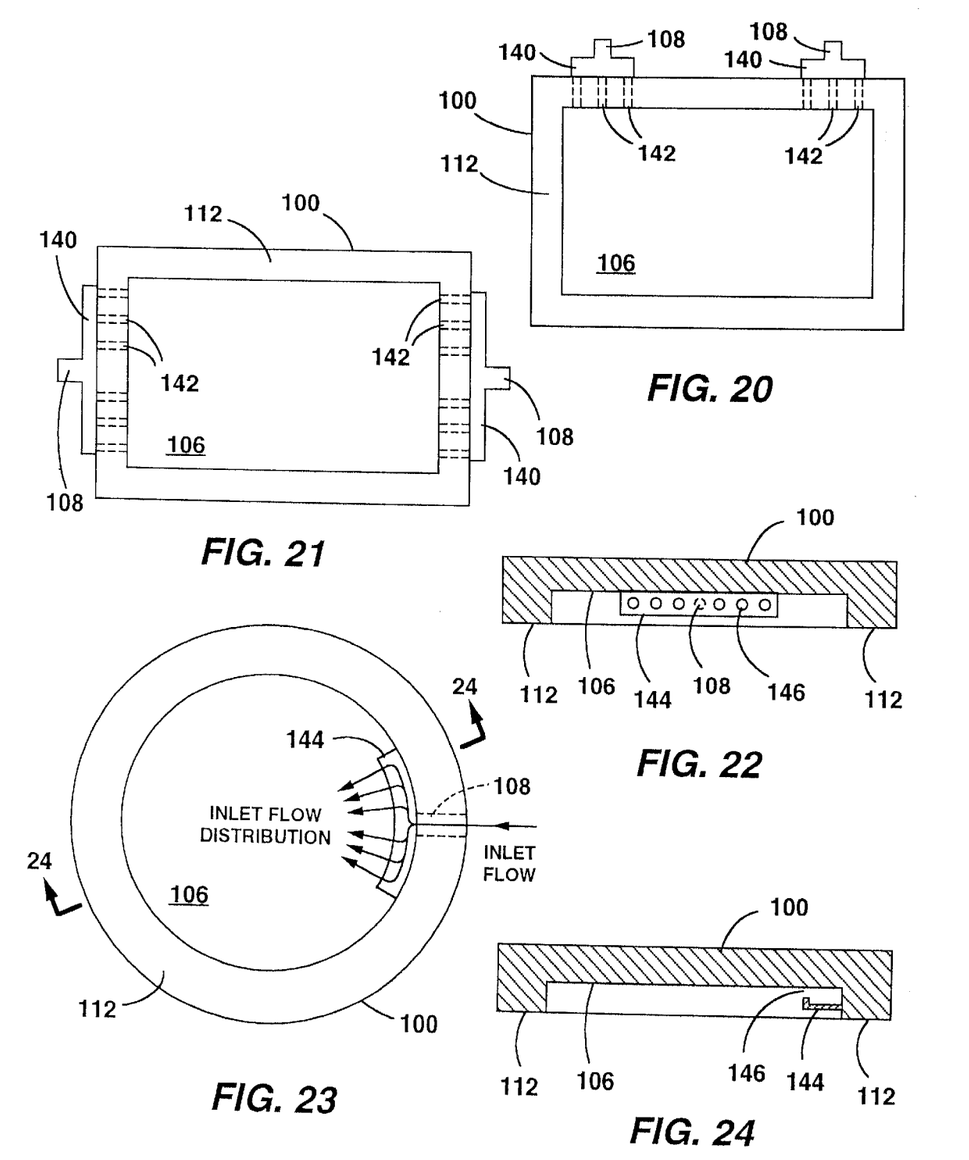
FIG. 22 is sectional view of an inlet plate with an internal peripheral transfer conduit.
FIG. 23 is a bottom plan view of the inlet plate of FIG. 22.
FIG. 24 is a sectional view of an inlet plate having an internal peripheral transfer conduit with a single slit.

Still another embodiment of the pressure-filter apparatus is discussed with reference to FIGS. 22–29. In this embodiment, as shown in FIG. 22, the inlet distributor comprises a transfer conduit 144, interior to inlet plate 100 and located along the periphery of shallow inlet cavity 106. Conduit 144 is in communication with inlet port 108 and includes at least one opening 146, oriented substantially parallel to filter medium 104 and supporting surface 116 (FIG. 1). Such orientation of opening 146 provides an optimal distribution of the slurry within the filtration chamber and permits subsequent application of pressurized fluids through the transfer conduit to the slurry inside the filtration chamber without disturbing the uniform distribution of that slurry. The distribution of inlet flow produced by transfer conduit 144 is represented in FIG. 23. Referring back to FIG. 22, the total area of at least one opening 144 is at least equal to or greater than the area of inlet port 108. This geometry reduces the inlet velocity of the slurry as it passes through transfer conduit 144 and enters inlet cavity 106. As the slurry fills the shallow filtration chamber, its flow is rendered laminar by transfer conduit 144, thus promoting uniform distribution of that slurry in the chamber. At least one opening 146 may comprise a plurality of round apertures or longitudinal slots, or may even be a single slit disposed along the entire length of the transfer conduit, as apparent from FIG. 24, which is a sectional view taken along the lines 24—24 of FIG. 23. Transfer conduit 144 may have a L-shaped transverse section, but other sections, such as U-, O-, or V-shaped sections may be utilized as necessary. Transfer conduit 144 may be made of metal and could be attached to the interior of cavity 106, e.g., by welds (not shown). The transfer conduit may also be made from other materials, e.g., plastic, and may be monolithic with or attached along the periphery of the inlet cavity using other known fastening means.

Figure 25:
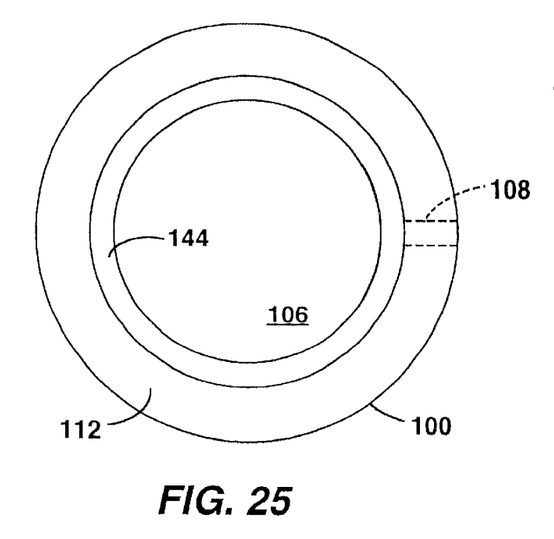
FIGS. 25 and 26 are bottom plan views of inlet plates each having an internal peripheral transfer conduit in a continuous configuration.
Figure 26:
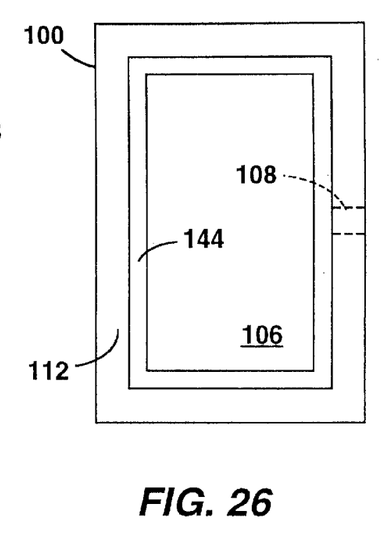
Figure 27:
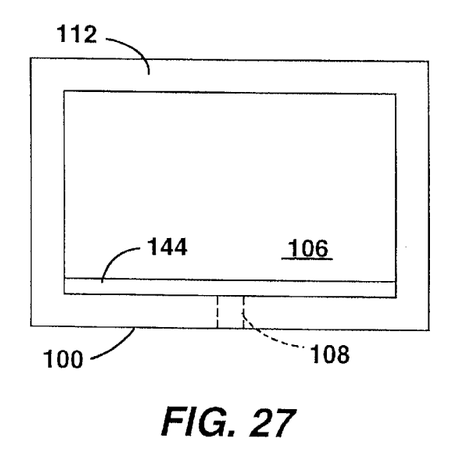
FIG. 27 is a bottom plan view of a rectangular inlet plate with an internal peripheral transfer conduit disposed along one side thereof.
Figure 28:
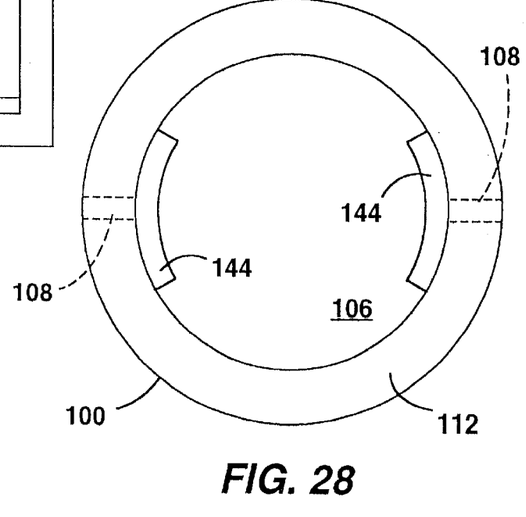
FIGS. 28 and 29 are bottom plan views of inlet plates each including a plurality of internal peripheral transfer conduits.
Figure 29:
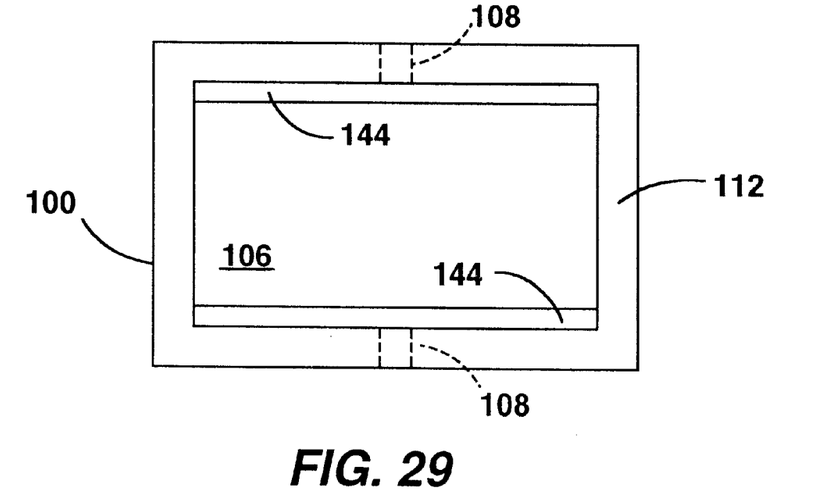

As evident from FIGS. 25 and 26, internal transfer conduit 144 may have a continuous peripheral configuration. A square inlet plate 100 may also be fitted with transfer conduit 144 configured in a manner illustrated in FIG. 27. Furthermore, an inlet plate may include a plurality of intake ports 108 and a plurality of internal transfer conduits 144, disposed as shown in FIGS. 28 and 29.

Figure 30:
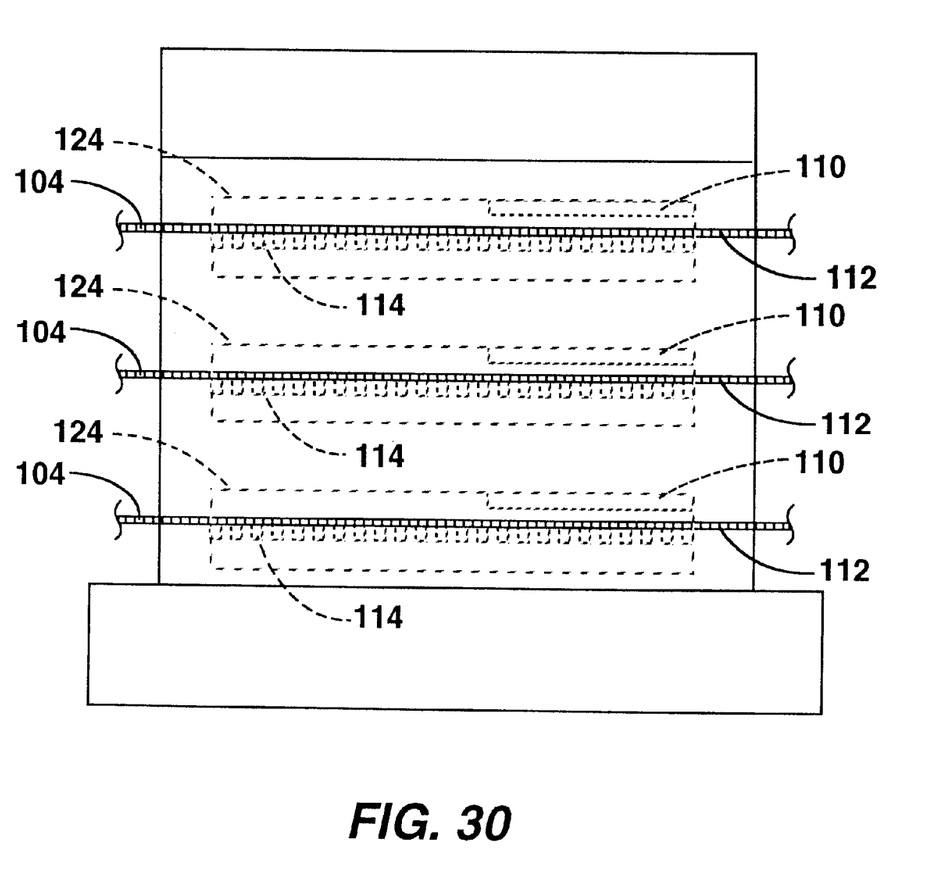
FIG. 30 is a schematic view of a multi-chamber pressure-filter apparatus.

The previously-described embodiments of the present invention may be implemented not only in a filter apparatus having a single filtration chamber, but also in an apparatus having a plurality of stacked shallow filtration chambers, as schematically represented in FIG. 30, each individual chamber being constructed substantially as has been described above. The necessary details regarding the basic configuration of such a multi-chamber filter apparatus are disclosed in U.S. Pat. Nos. 5,510,025 and 5,573,667 to the present inventor. An additional advantage of a multi-chamber architecture in view of the present invention is that due to the shallow configuration of the filtration chamber 124, the available filter area of a multi-chamber filter apparatus is maximized because a greater number of filtration chambers can now exist in the same vertical space.

The above configurations of pressure-filter apparatus are given only as examples. Therefore, the scope of the invention should be determined not by the illustrations given, but by the appended claims and their equivalents.

What is claimed is:

1. A pressure filter for filtering viscous fluid slurry comprising:
   a first and a second continuous mating surfaces movable relative to each other and defining a volume open area therebetween when said mating surfaces are in contact with each other;
   a supporting surface bounded by and substantially coplanar with said first continuous mating surface and extending across said volume open area;
   a shallow inlet cavity further defining said volume open area on its sides bounded by said second continuous mating surface when in contact with said first continuous mating surface, on its bottom by said supporting surface, and on its top by the interior of said second mating surface;
   an inlet distributor in fluid communication with said shallow inlet cavity, said inlet distributor including means for directing said fluid slurry uniformity and evenly throughout said shallow filtration cavity to establish a complete filling of said shallow inlet cavity; and
   a filter medium capable of being disposed between said first and said second continuous mating surfaces, whereby a shallow filtration chamber is defined by said shallow inlet cavity and said filter medium when said first and said second continuous mating surfaces are pressed together, said shallow filtration chamber having a depth from about 0.25 of an inch to about 2.5 inches.

2. The pressure filter of claim 1 wherein said inlet distributor includes at least one baffle plate substantially parallel to said supporting surface.

3. The pressure filter of claim 2 wherein said inlet distributor further includes at least one distribution recess directed toward said at least one baffle plate.

4. A pressure filter of claim 1 wherein said inlet distributor includes:
   a plurality of openings in fluid communication with said shallow inlet cavity; and
   at least one transfer conduit, each in fluid communication with at least two of said plurality of openings and external to said shallow inlet cavity.

5. The pressure filter of claim 4 wherein said at least one plurality of openings are directed substantially parallel to said supporting surface.

6. The pressure filter of claim 1 wherein said inlet distributor includes at least one transfer conduit internal to said shallow inlet cavity and having at least one opening.

7. The pressure filter of claim 6 wherein said at least one opening is directed substantially parallel to said supporting surface.

8. The pressure filter of claim 7 wherein said at least one transfer conduit is located along the periphery of said shallow inlet cavity.

9. The pressure filter of claim 7 wherein said at least one transfer conduit projects into the interior of said shallow inlet cavity.

10. A pressure filter comprising:
   a plurality of first continuous mating surfaces and a plurality of second continuous mating surfaces, said pluralities of first and second continuous mating surfaces movable relative to each other;
   a plurality of supporting surfaces, each one bounded by and substantially coplanar with one of said plurality of first continuous mating surfaces;
   a plurality of shallow inlet cavities, each one bounded by one of said plurality of second continuous mating surfaces;
   a plurality of inlet distributors, each one in fluid communication with one of said plurality of shallow inlet cavities; and
   a plurality of filter mediums, each one capable of being disposed between one of said plurality of first continuous mating surfaces and one of said plurality of second continuous mating surfaces, whereby a plurality of shallow filtration chambers is defined by said plurality of inlet cavities and said plurality of filter mediums when said plurality of first continuous mating surfaces is pressed together with said plurality of second continuous mating surfaces, each of said plurality of shallow filtration chambers having a depth from about 0.25 of an inch to about 2.5 inches.

11. The pressure filter of claim 10 wherein each one of said plurality of inlet distributors includes at least one baffle plate substantially parallel to said plurality of supporting surfaces.

12. The pressure filter of claim 11 wherein each one of said plurality of inlet distributors further includes at least one distribution recess directed toward said at least one baffle plate.

13. A pressure filter of claim 10 wherein each one of said plurality of inlet distributors includes:
   a plurality of openings in fluid communication with one of said plurality of shallow inlet cavities; and
   at least one transfer conduit, each in fluid communication with at least two of said plurality of openings and external to one of said plurality of shallow inlet cavities.

14. The pressure filter of claim 13 wherein said at least one plurality of openings is directed substantially parallel to said plurality of supporting surfaces.

15. The pressure filter of claim 10 wherein each one of said plurality of inlet distributors includes at least one transfer conduit internal to one of said plurality of shallow inlet cavities and having at least one opening.

16. The pressure filter of claim 15 wherein said at least one opening is directed substantially parallel to said plurality of supporting surfaces.

17. The pressure filter of claim 16 wherein said at least one transfer conduit is located along the periphery of one of said plurality of shallow inlet cavities.

18. The pressure filter of claim 16 wherein said at least one transfer conduit projects into the interior of one of said plurality of shallow inlet cavities.

* * * * *